(12) United States Patent
Li et al.

(10) Patent No.: US 11,956,048 B2
(45) Date of Patent: Apr. 9, 2024

(54) SYSTEMS AND METHODS FOR MEASUREMENT PERIOD AND ACCURACY FOR BEAM REPORTING BASED ON L1-RSRP

(71) Applicant: APPLE INC., Cupertino, CA (US)

(72) Inventors: Hua Li, Beijing (CN); Jie Cui, Santa Clara, CA (US); Yang Tang, Santa Clara, CA (US); Qiming Li, Beijing (CN); Manasa Raghavan, Sunnyale, CA (US); Zhibin Yu, Unterhaching (DE)

(73) Assignee: APPLE INC., Cupertino, CA (US)

( * ) Notice: Subject to any disclaimer, the term of this patent is extended or adjusted under 35 U.S.C. 154(b) by 480 days.

(21) Appl. No.: 17/277,133

(22) PCT Filed: Sep. 26, 2019

(86) PCT No.: PCT/US2019/053210
§ 371 (c)(1),
(2) Date: Mar. 17, 2021

(87) PCT Pub. No.: WO2020/069164
PCT Pub. Date: Apr. 2, 2020

(65) Prior Publication Data
US 2022/0038165 A1 Feb. 3, 2022

Related U.S. Application Data

(60) Provisional application No. 62/738,268, filed on Sep. 28, 2018.

(51) Int. Cl.
*H04W 56/00* (2009.01)
*H04B 7/06* (2006.01)
*H04B 17/318* (2015.01)

(52) U.S. Cl.
CPC ......... *H04B 7/0695* (2013.01); *H04B 7/0626* (2013.01); *H04B 17/318* (2015.01); *H04W 56/001* (2013.01)

(58) Field of Classification Search
CPC .. H04B 7/0695; H04B 7/0626; H04B 17/318; H04B 7/063; H04B 7/0632;
(Continued)

(56) References Cited

U.S. PATENT DOCUMENTS 5,961,458 A 10/1999 Carroll et al.
6,272,373 B1 8/2001 Bouton et al.
(Continued)

FOREIGN PATENT DOCUMENTS

CN 103220048 A 7/2013
EP 3054617 A1 8/2016
(Continued)

OTHER PUBLICATIONS

NTT DOCOMO, Inc., et al.,"Evaluation period for L1-RSRP measurement", R4-1808764, 3GPP TSG RAN WG4 Meeting NR-AH #1807, Montreal, Canada. Agenda Item 5.2.4.4 ,Jul. 2-6, 2018 ,9 pages (Year: 2018).*

(Continued)

*Primary Examiner* — Lan-Huong Truong
(74) *Attorney, Agent, or Firm* — Dorsey & Whitney LLP

(57) ABSTRACT

Systems and methods provide for beam detection in a wireless communication system. An apparatus for a UE may be configured to identify a plurality of CSI-RS resources corresponding to different Tx beams configured for measurement by the UE, measure an L1-RSRP for the plurality of CSI-RS resources, determine a selected Tx beam of the different Tx beams based on measured L1-RSRP values for the plurality of CSI-RS resources, and determine a measurement accuracy of a first L1-RSRP value corresponding to the
(Continued)

selected Tx beam based on successful beam detection probability.

6 Claims, 8 Drawing Sheets

(58) Field of Classification Search
CPC .. H04B 7/0639; H04B 17/327; H04B 7/0408; H04W 56/001; H04W 52/42; H04W 24/10; H04L 5/0023; H04L 5/0048
See application file for complete search history.

(56) References Cited

U.S. PATENT DOCUMENTS

| | | | |
|---|---|---|---|
| 10,772,151 B2 * | 9/2020 | Zhou | H04B 7/0695 |
| 2005/0288567 A1 | 12/2005 | Tomita et al. | |
| 2009/0283698 A1 | 11/2009 | Chapman | |
| 2009/0326371 A1 | 12/2009 | McFerron | |
| 2010/0288936 A1 | 11/2010 | Call | |
| 2016/0150435 A1 | 5/2016 | Baek et al. | |
| 2018/0219664 A1 | 8/2018 | Guo et al. | |
| 2020/0014453 A1 * | 1/2020 | Takeda | H04W 74/0833 |

FOREIGN PATENT DOCUMENTS

| | | |
|---|---|---|
| WO | 2018064327 A1 | 4/2018 |
| WO | 2018168670 A1 | 9/2018 |
| WO | 20180173238 A1 | 9/2018 |

OTHER PUBLICATIONS

Intel Corporation, et al.,"Discussion about L1-RSRP measurement accuracy for beam management, R4-1809883, 3GPP TSG-RAN WG4 Meeting #88", Gothenburg, Sweden, Agenda Item 7.11.4.4.1,Aug. 20-26, 2018 ,8 pages (Year: 2018).*
NTT DOCOMO, Inc. , "Evaluation period for L1-RSRP measurement", R4-1808764, 3GPP TSG RAN WG4 Meeting NR-AH#1807, Montreal, Canada, Agenda Item 5.2.4.4, Jul. 2-6, 2018, 9 pages.
Nokia, Nokia Shanghai Bell , "CSI-RS and SSB L1 RSRP for beam management", R4-1809082, 3GPP TSG-RAN WG4 Meeting-AH-1807, Montreal, Canada, Agenda Item 5.2.4.4, Jul. 2-6, 2018, 5 pages.
Nokia, Nokia Shanghai Bell , "Joint L1-RSRP Beam Reporting for SSB and CSI-RS", R1-1807193, 3GPP TSG RAN WG1 Meeting #93, Busan, Korea, Agenda Item 7.1.2.2.6, May 21-25, 2018, 3 pages.
Intel Corporation, et al.,"Discussion about L1-RSRP measurement accuracy for beam management, R4-1809883, 3GPP TSG-RAN WG4 Meeting #88", Gothenburg, Sweden, Agenda Item 7.11.4.4.1 ,Aug. 20-26, 2018 ,8 pages.
NTT DOCOMO, Inc., et al.,"Evaluation period for L1-RSRP measurement", R4-1808764, 3GPP TSG RAN WG4 Meeting NR-AH#1807, Montreal, Canada. Agenda Item 5.2.4.4 ,Jul. 2-6, 2018 ,9 pages.
PCT/US2019/053210, et al., International Search Report and Written Opinion , dated Jan. 15, 2020 ,11 pages.
Samsung, et al.,"Simulation results for SSB based L1-RSRP measurement", R4-1809934, 3GPP TSG-RAN WG4 Meeting #88, Gothenburg, Sweden, Agenda Item 7.11.4.4.1 ,Aug. 20-24, 2018 ,7 pages.

* cited by examiner

SYSTEMS AND METHODS FOR MEASUREMENT PERIOD AND ACCURACY FOR BEAM REPORTING BASED ON L1-RSRP

CROSS-REFERENCE TO RELATED APPLICATION(S)

This application is a national stage filing under 35 U.S.C. § 371 of International Patent Application No. PCT/US2019/053210, filed Sep. 26, 2019 which claims the benefit of U.S. Provisional Application No. 62/738,268, filed Sep. 28, 2018, each of which is hereby incorporated by reference herein in its entirety.

TECHNICAL FIELD

This application relates generally to wireless communication systems, and more specifically to L1-RSRP measurement and reporting.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
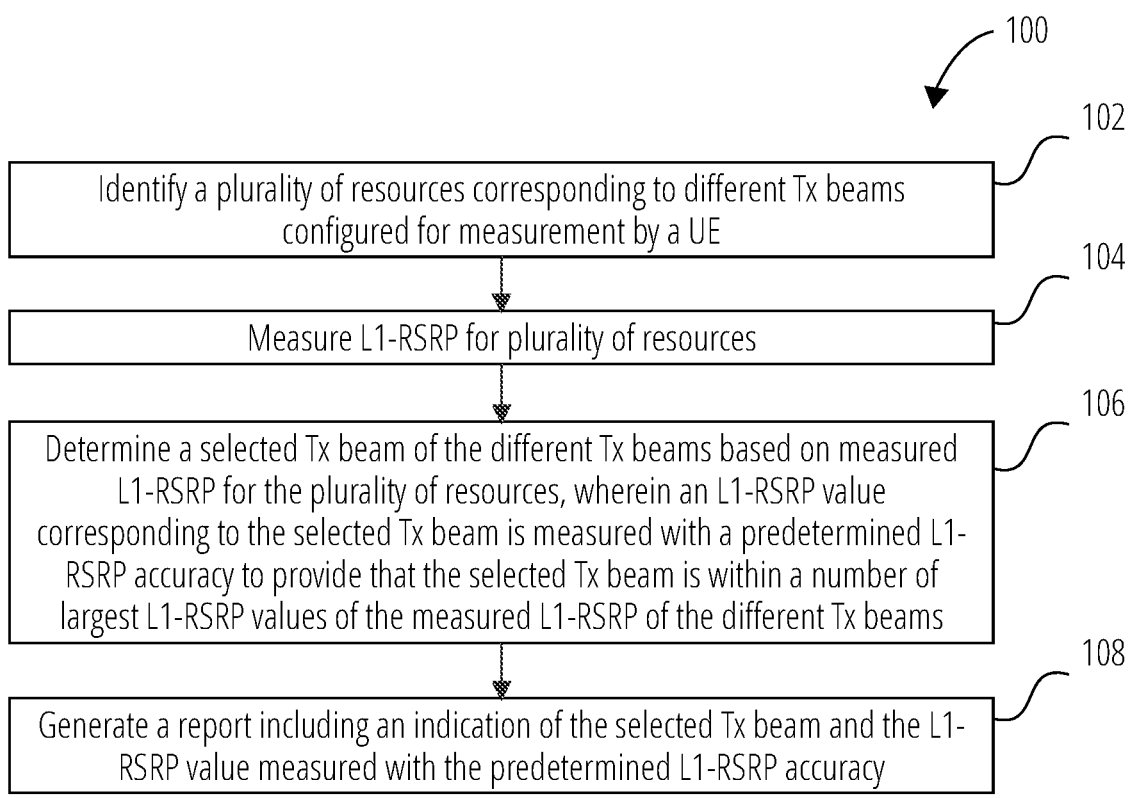
FIG. 1 is flowchart illustrating a method for beam management by a UE in a wireless communication system in accordance with one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Layer 1 (L1)-Reference Signal Received Power (RSRP) may be used for beam reporting. L1-RSRP measurement reporting may include synchronization signal block (SSB) based L1-RSRP reporting and/or channel state information reference signal (CSI-RS) based L1-RSRP reporting. However, the definition of the L1-RSRP measurement accuracy and period for beam reporting are not clear. Embodiments herein define the L1-RSRP measurement period and accuracy for beam reporting.

For beam management, a UE may measure the L1-RSRP for different beams and choose the proper beams to indicate to a gNB. A remaining issues for beam management is the number of samples to use for L1-RSRP measurement. For LTE and NR RSRP, the number of samples or measurements is derived such that a minimum measurement accuracy requirement can be met. For L1-RSRP, a similar approach may be taken.

However, it has not previously been determined how accurate of an L1-RSRP measurement is accurate enough. L1-RSRP accuracy should be better than SSB-based RSRP accuracy. The reason is that L1-RSRP beam density should be higher than SSB-based RSRP beam density. To distinguish a beam with high beam density, the measurement should be more accurate.

In recognition of the above deficiencies, the inventors of the application investigated the L1-RSRP difference between different transmit (TX) beams. By statistically calculating the L1-RSRP difference, a sufficient measurement accuracy was determined to distinguish between the different Tx beams. Table 1 lists certain simulation assumptions used for the analysis.

TABLE 1

| Simulation parameters | Comments/values |
|---|---|
| Tx beam configuration with 32 beams | 8*4(horizontal Tx elements number, vertical Tx elements number) |
| Tx beam configuration with 16 beams | 4*4(horizontal Tx elements number, vertical Tx elements number) |
| Tx beam configuration with 8 beams | 2*4(horizontal Tx elements number, vertical Tx elements number) |
| Tx beamforming | Discrete Fourier Transform (DFT) codebook |
| UE receive antennas | 4*2(horizontal Rx elements number, vertical Rx elements number) |
| Rx beamforming | DFT codebook |
| Propagation conditions | Clustered Delay Line (CDL)-C (delay spread: 30 ns UE speed: 3 km/h) |
| SINR | No noise and interference are considered. |
| Angle between gNB and UE | Random during drops |

Different beam densities may be considered and defined by the number of beams, M, covering the whole spatial domain. In this example M=32 beams, 16 beams, and 8 beams. In certain embodiments, the UE measures the L1-RSRP for each of M Tx beams respectively and sorts the beams in decreasing order based on the measured L1-RSRP. For example, the UE may sort the Tx beams where a first beam is the beam with the highest L1-RSRP and the M-th beam is the beam with the lowest L1-RSRP. Table 2 summarizes the resolution of beams and the corresponding L1-RSRP accuracy.

TABLE 2

| | Resolution of beams | Geni L1-RSRP difference at 10 percentile | L1-RSRP accuracy to achieve the resolution |
|---|---|---|---|
| Total # of Tx beam is 8 | Distinguish between 1st strongest and the 2nd strongest | 0.4 dB | N/A |
| | Distinguish between 1st strongest and the 5th strongest | 9.2 dB | ±2.6 dB |
| Total # of Tx beam is 16 | Distinguish between 1st strongest and the 2nd strongest | 0.3 dB | N/A |
| | Distinguish between 1st strongest and the 6th strongest | 6.2 dB | ±1.1 dB |
| | Distinguish between 1st strongest and the 8th strongest | 9 dB | ±2.5 dB |
| Total # of Tx beam is 32 | Distinguish between 1st strongest and the 2nd strongest | 0.2 dB | N/A |
| | Distinguish between 1st strongest and the 6th strongest | 4.5 dB | ±0.25 dB |
| | Distinguish between 1st strongest and the 12th strongest | 9 dB | ±2.5 dB |

As derived from Table 2, an L1-RSRP accuracy with plus or minus (±) 2.5 decibels (dB) (e.g., with no implementation margin considered) may guarantee that the reported beam can be within the best 5/8/12 beams for total 8/16/32 beams in 90% cases respectively. In other words, with an L1-RSRP accuracy of ±2.5 dB, when the total number of Tx beams is 8 the reported beam is within the best 5 beams, when the total number of Tx beams is 16 the reported beam is within the best 8 beams, and when the total number of Tx beams is 32 the reported beam is within the best 12 beams.

For periodic CSI-RS based L1-RSRP, there may be two options for measurement period: single slot or single sample measurement; and averaging with X samples. For aperiodic CSI-RS, only single sample measurement can be applied. For simplicity, single sample based measurement can be defined for periodic CSI-RS as well. Otherwise, two different test cases will be defined which will bring more complexity. On the other hand, single sample based measurement brings more flexibility. For SSB L1-RSRP, single sample based measurement can be applied as well. In certain embodiments, it is left to the gNB to average the measurement reports.

Certain embodiments provide different options for defining the L1-RSRP measurement accuracy for beam reporting based on one sample measurement.

For example, in one embodiment using a single sample measurement, an SSB based L1-RSRP accuracy requirement is 5.5 dB for a first frequency range (FR1) when the signal-to-noise ratio (SNR) is −3 dB. For CSI-RS based L1-RSRP with a density (D) of 3, the L1-RSRP accuracy requirement is 5.5 dB for FR1 when SNR=−3 dB.

In another embodiment using a single sample measurement, the SSB based L1-RSRP accuracy requirement is 4.5 dB for FR1 when SNR>=−2 dB. For CSI-RS based L1-RSRP with D=3, The L1-RSRP accuracy requirement is 4.5 dB for FR1 when SNR>=−2 dB.

In another embodiment, for CSI-RS based L1-RSRP with D=3 where the resource block (RB) number is larger than 48RB, the L1-RSRP accuracy requirement is 4.5 dB for FR1 when SNR=−3 dB.

In these example embodiments, FR1 may be in a frequency range of about 450 MHz-6 GHz.

Depending on the density of CSI-RS, measurement bandwidth, Doppler and numerology, the L1-RSRP estimation accuracy may not be guaranteed by single sample. Certain embodiments herein perform averaging between samples to help improve the measurement accuracy. One sample or multiple samples can be used to calculate the L1-RSRP for different Tx beams. In one embodiment, for example, if L1-RSRP based on a single sample does not achieve a beam detection probability that is greater than about 90%, multiple samples are used to improve the estimation accuracy. The exact sample number may be determined through simulation. The measurement accuracy may then be defined based by the sample number. Similar with other RSRP requirements, for example, by plotting the cumulative distribution function (CDF) of an RSRP measurement accuracy curve, the maximum RSRP delta corresponding to 5% and 95% of the curve can be defined.

The Tx beam pattern may have an impact on the beam detection probability. If a Tx beam has high correlation and the beam direction of the various Tx beams are close to one another, it may be more difficult to distinguish the best beam. In certain embodiments, Tx beams are equally sampled in the spatial domain. For example, Tx beam direction is equally divided by/N where N is the Tx beam number. In addition, or in other embodiments, another simplified method with different power boosting is provided for different Tx beams since the beamforming gain can be equal to effective SNR to some extent. For example, for four Tx beams, the power boosting for different Tx beams can be 0dB, 2 dB, 4 dB, 5 dB.

The CSI-RS resources configured for L1-RSRP measurement may be transmitted corresponding to a number of resource element (RE) per resource block (RB) per port. Increasing the density may improve measurement accuracy. For example, the L1-RSRP accuracy may degrade in extended typical urban (ETU) channel compared with an extended pedestrian A (EPA) channel. Also, the L1-RSRP accuracy based on a density of D=1 performs much worse than that based on D=3 in an ETU channel for both 24 RB and 96 RB. As a further example, for 24 RB with D=1, the worst L1-RSRP accuracy may be 4.5 dB for one sample, which is larger than 2.5 dB with five samples at an SNR=0 dB in an ETU channel. Thus, various embodiments herein define a density of D=3 as the baseline for CSI-RS based L1-RSRP reporting. In other embodiments, a density three or great may be used.

FIG. 1 is flowchart illustrating a method 100 for beam management by a UE in a wireless communication system according to one embodiment. In block 102, the method 100 identifies a plurality of resources corresponding to different Tx beams configured for measurement by the UE. In block 104, the method 100 measures an L1-RSRP for the plurality of resources. In block 106, the method 100 determines a selected Tx beam of the different Tx beams based on measured L1-RSRP for the plurality of resources, wherein an L1-RSRP value corresponding to the selected Tx beam is measured with a predetermined L1-RSRP accuracy to provide that the selected Tx beam is within a number of largest L1-RSRP values of the measured L1-RSRP of the different Tx beams. In block 108, the method 100 generates a report including an indication of the selected Tx beam and the L1-RSRP value measured with the predetermined L1-RSRP accuracy.

Beam Management.

In new radio (NR) implementations, beam management may refer to a set of L1/L2 procedures to acquire and maintain a set of TRP(s) and/or UE beams that can be used for downlink (DL) and uplink (UL) transmission/reception, which may include beam determination, which may refer to TRxP(s) or UE ability to select of its own transmission (Tx)/reception (Rx) beam(s); beam measurement, which may refer to transmission/reception point(s) (TRP or TRxP) or UE ability to measure characteristics of received beamformed signals; beam reporting, which may refer the UE ability to report information of beamformed signal(s) based on beam measurement; and beam sweeping, which may refer to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management may include procedures P-1, P-2, and P-3. Procedure P-1 may be used to enable UE measurement on different TRxP Tx beams to support selection of TRxP Tx beams/UE Rx beam(s). For beamforming at TRxP, procedure P-1 typically includes an intra/inter-TRxP Tx beam sweep from a set of different beams. For beamforming at the UE, procedure P-1 typically includes a UE Rx beam sweep from a set of different beams.

Procedure P-2 may be used to enable UE measurement on different TRxP Tx beams to possibly change inter/intra-TRxP Tx beam(s). Procedure P-2 may be a special case of procedure P-1 wherein procedure P-2 may be used for a possibly smaller set of beams for beam refinement than procedure P-1. Procedure P-3 may be used to enable UE measurement on the same TRxP Tx beam to change UE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE may report measurement results of N selected Tx beams (where N may or may not be a fixed number). The procedure based on RS for mobility purpose is not precluded. Beam information that is to be reported may include measurement quantities for the N beam(s) and information indicating N DL Tx beam(s), if N<K. Other information or data may be included in or with the beam information. When a UE is configured with K'>1 non-zero power (NZP) CSI-RS resources, a UE can report N' CSI-RS Resource Indicator (CRIs).

In some NR implementations, a UE can trigger a mechanism to recover from beam failure, which may be referred to a "beam recovery", "beam failure recovery request procedure", and/or the like. A beam failure event may occur when the quality of beam pair link(s) of an associated control channel falls below a threshold, when a time-out of an associated timer occurs, or the like. The beam recovery mechanism may be triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal is supported for allowing the UE to monitor the beams for identifying new potential beams.

For beam failure recovery, a beam failure should be declared if all the serving PDCCH beams fail. The beam failure recovery request procedure may be initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the UE.

In some implementations, beam management may include providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

Downlink (DL) beam indications may be based on a Transmission Configuration Indication (TCI) state(s). The TCI state(s) may be indicated in a TCI list that is configured by radio resource control (RRC) and/or Media Access Control (MAC) Control Element (CE). In some implementations, a UE can be configured up to M TCI-States by higher layer signaling to decode PDSCH according to a detected PDCCH with downlink control information (DCI) intended for the UE and the given serving cell where M depends on the UE capability. Each configured TCI state includes one reference signal (RS) set TCI-RS-SetConfig. Each TCI-RS-SetConfig may include parameters for configuring quasi co-location relationship(s) between the RSs in the RS set and the demodulation reference signal (DM-RS) port group of the PDSCH. The RS set may include a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE may receive a selection command (e.g., in a MAC CE), which may be used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

A beam failure recovery request could be delivered over dedicated PRACH or Physical Uplink Control Channel (PUCCH) resources. For example, a UE can be configured, for a serving cell, with a set (q0) of periodic CSI-RS resource configuration indexes by higher layer parameter Beam-Failure-Detection-RS-ResourceConfig and with a set (q1) of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE may determine set (q0) to include SS/PBCH blocks and periodic CSI-RS configurations with same values for higher layer parameter TCI-StatesPDCCH as for control resource sets (CORESET) that the UE is configured for monitoring PDCCH.

The physical layer of a UE may assess the radio link quality according to a set of resource configurations against a threshold $Q_{out,LR}$. The threshold $Q_{out,LR}$ corresponds to a default value of higher layer parameter RLM-IS-OOS-thresholdConfig and Beam-failure-candidate-beam-threshold, respectively. For the set (q0), the UE may assess the radio link quality only according to periodic CSI-RS resource configurations or SS/PBCH blocks that are quasi co-located, with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

In some implementations, if a beam failure indication has been received by a MAC entity from lower layers, then the MAC entity may start a beam failure recovery timer (beamFailureRecoveryTimer) and initiate a Random Access procedure. If the beamFailureRecoveryTimer expires, then the MAC entity may indicate a beam failure recovery request failure to upper layers. If a downlink assignment or uplink grant has been received (e.g., on a PDCCH addressed for a cell radio network temporary identifier (C-RNTI)), then the MAC entity may stop and reset beamFailureRecovery-Timer and consider the beam failure recovery request procedure to be successfully completed.

Beam Measurement.

In embodiments, a UE (e.g., in RRC_CONNECTED mode) may measure multiple beams (at least one) of a cell and the measurements results (power values) are averaged to derive the cell quality. The UE may be configured to consider a subset of the detected beams, such as the N best beams above an absolute threshold. Filtering may take place at two different levels include at the physical layer (PHY) to derive beam quality and then at the RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB. For channel state estimation purposes, the UE may be configured to measure CSI-RS resources and estimate a downlink channel state based on the CSI-RS measurements. The UE may feed the estimated channel state back to the gNB to be used in link adaptation.

Figure 2:
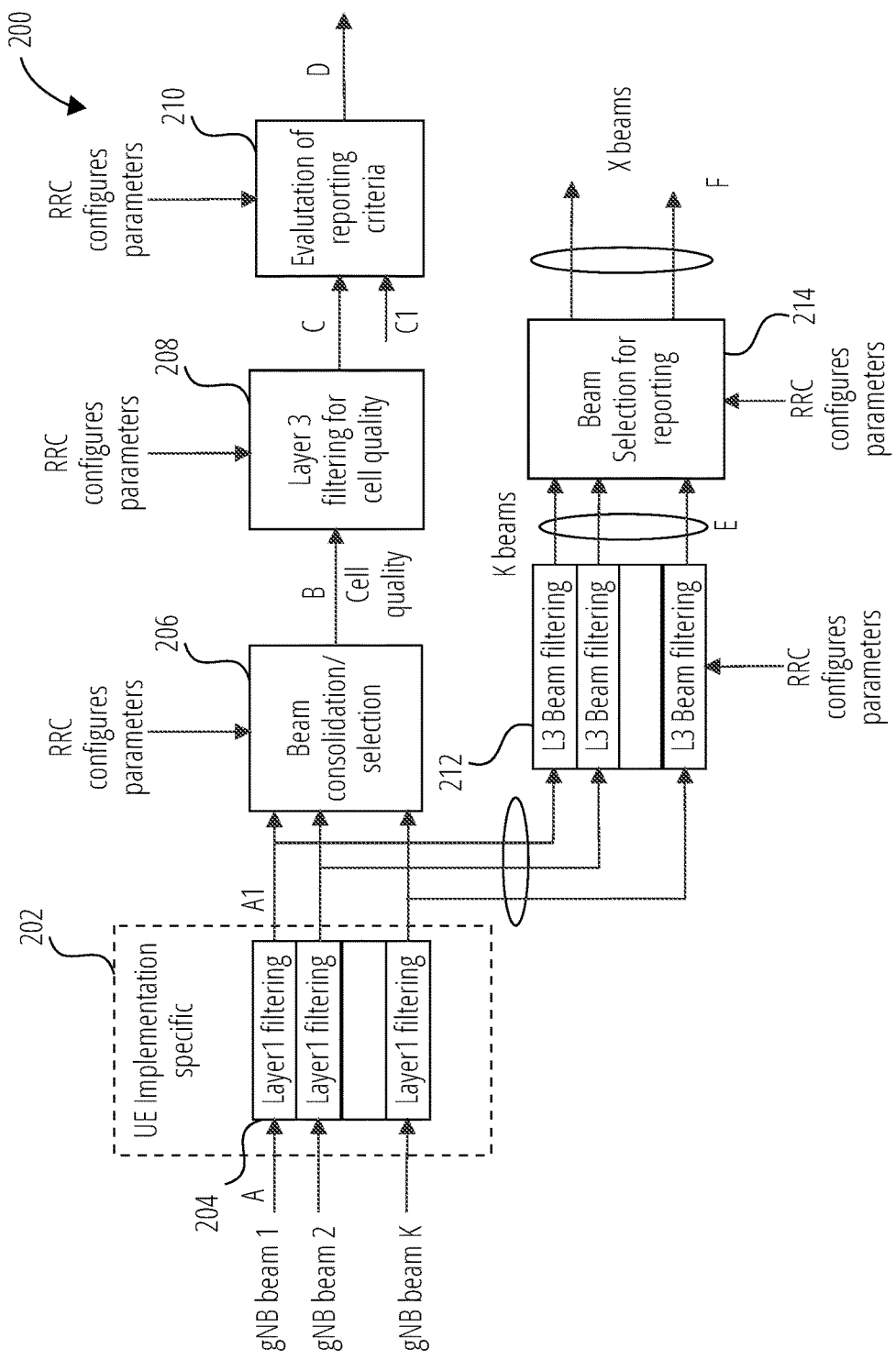
FIG. 2 illustrates an example beam measurement model in accordance with one embodiment.

An example beam measurement model 200 is shown by FIG. 2. The example beam measurement model 200 includes UE implementation specific circuitry 202, L1 filtering circuitry 204, beam consolidation/selection circuitry 206, L3 filtering for cell quality circuitry 208, evaluation of reporting criteria circuitry 210, L3 beam filtering circuitry 212, and beam selection for reporting circuitry 214. In FIG. 2, point A may include measurements (e.g., beam specific samples) internal to the PHY. Layer 1 (L1) filtering may include internal L1 filtering circuitry 204 for filtering the inputs measured at point A. The exact filtering mechanisms and how the measurements are actually executed at the PHY may be implementation specific. The measurements (e.g., beam specific measurements) may be reported by the L1 filtering circuitry 204 to the L3 beam filtering circuitry 212 and the beam consolidation/selection circuitry 206 at point A1.

The beam consolidation/selection circuitry 206 may include circuitry where beam specific measurements are consolidated to derive cell quality. For example, if N>1, else when N=1 the best beam measurement may be selected to derive cell quality. The configuration of the beam may be provided by RRC signaling. A measurement (e.g., cell quality) derived from the beam-specific measurements may then be reported to L3 filtering for cell quality circuitry 208 after beam consolidation/selection. In some embodiments, the reporting period at point B may be equal to one measurement period at point A1.

The L3 filtering for cell quality circuitry 208 may be configured to filter the measurements provided at point B. The configuration of the Layer 3 filters may be provided by the aforementioned RRC signaling or different/separate RRC signaling. In some embodiments, the filtering reporting period at point C may be equal to one measurement period at point B. A measurement after processing in the L3 filtering for cell quality circuitry 208 may be provided to the evaluation of reporting criteria circuitry 210 at point C. In some embodiments, the reporting rate may be identical to the reporting rate at point B. This measurement input may be used for one or more evaluation of reporting criteria.

The evaluation of reporting criteria circuitry 210 may be configured to check whether actual measurement reporting is necessary at point D. The evaluation can be based on more than one flow of measurements at reference point C. In one example, the evaluation may involve a comparison between different measurements, such as a measurement provided at point C and another measurement provided at point C1. In embodiments, the UE may evaluate the reporting criteria at least every time a new measurement result is reported at point C, C1. The reporting criteria configuration may be provided by the aforementioned RRC signaling (UE measurements) or different/separate RRC signaling. After the evaluation, measurement report information (e.g., as a message) may be sent on the radio interface at point D.

Referring back to point A1, measurements provided at point A1 may be provided to the L3 beam filtering circuitry 212, which may be configured to perform beam filtering of the provided measurements (e.g., beam specific measurements). The configuration of the beam filters is provided by the aforementioned RRC signaling or different/separate RRC signaling. In embodiments, the filtering reporting period at point E may be equal to one measurement period at A1. The K beams may correspond to the measurements on New Radio (NR)-synchronization signal (SS) block (SSB) or Channel State Information Reference Signal (CSI-RS) resources configured for L3 mobility by a gNB and detected by the UE at L1.

After processing in the beam filter measurement (e.g., beam-specific measurement), a measurement may be provided to the beam selection for reporting circuitry 214 at point E. This measurement may be used as an input for selecting the X measurements to be reported. In embodiments, the reporting rate may be identical to the reporting rate at point A1. The beam selection for reporting circuitry 214 may be configured to select the X measurements from the measurements provided at point E. The configuration of this module may be provided by the aforementioned RRC signaling or different/separate RRC signaling. The beam measurement information to be included in a measurement report may be sent or scheduled for transmission on the radio interface at point F.

The measurement reports may include a measurement identity of an associated measurement configuration that triggered the reporting. The measurement reports may include cell and beam measurement quantities to be included in measurement reports that are configured by the network (e.g., using RRC signaling). The measurement reports may include number of non-serving cells to be reported can be limited through configuration by the network. Cell(s) belonging to a blacklist configured by the network may not be used in event evaluation and reporting. By contrast, when a whitelist is configured by the network, only the cells belonging to the whitelist may be used in event evaluation and reporting. The beam measurements to be included in measurement reports may be configured by the network, and such measurement reports may include or indicate a beam identifier only, a measurement result and beam identifier, or no beam reporting.

Example Systems and Devices.

Figure 3:
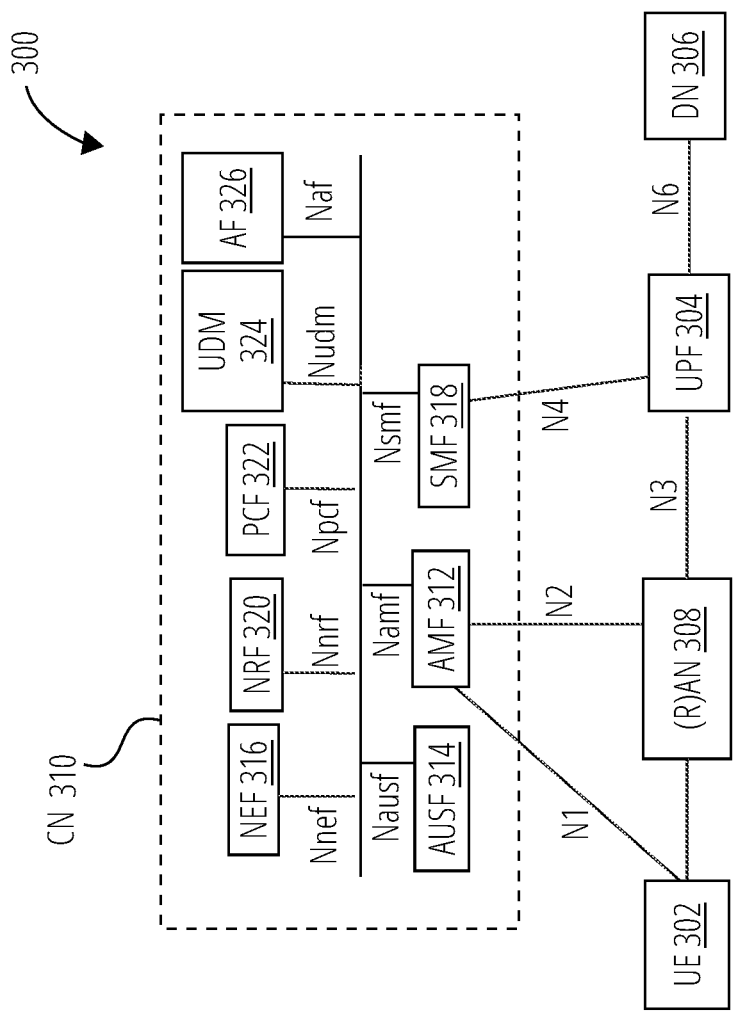
FIG. 3 illustrates a system in accordance with one embodiment.

FIG. 3 illustrates an architecture of a system 300 of a network in accordance with some embodiments. The system 300 is shown to include a UE 302; a 5G access node or RAN node (shown as (R)AN node 308); a User Plane Function (shown as UPF 304); a Data Network (DN 306), which may be, for example, operator services, Internet access or 3rd party services; and a 5G Core Network (5GC) (shown as CN 310).

The CN 310 may include an Authentication Server Function (AUSF 314); a Core Access and Mobility Management Function (AMF 312); a Session Management Function (SMF 318); a Network Exposure Function (NEF 316); a Policy Control Function (PCF 322); a Network Function (NF) Repository Function (NRF 320); a Unified Data Management (UDM 324); and an Application Function (AF 326). The CN 310 may also include other elements that are not shown, such as a Structured Data Storage network function (SDSF), an Unstructured Data Storage network function (UDSF), and the like.

The UPF 304 may act as an anchor point for intra-RAT and inter-RAT mobility, an external PDU session point of interconnect to DN 306, and a branching point to support multi-homed PDU session. The UPF 304 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 304 may include an uplink classifier to support routing traffic flows to a data network. The DN 306 may represent various network operator services, Internet access, or third party services.

The AUSF 314 may store data for authentication of UE 302 and handle authentication related functionality. The AUSF 314 may facilitate a common authentication framework for various access types.

The AMF 312 may be responsible for registration management (e.g., for registering UE 302, etc.), connection management, reachability management, mobility management, and lawful interception of AMF-related events, and access authentication and authorization. AMF 312 may provide transport for SM messages for the SMF 318, and act as a transparent proxy for routing SM messages. AMF 312 may also provide transport for short message service (SMS) messages between UE 302 and an SMS function (SMSF) (not shown by FIG. 3). AMF 312 may act as Security Anchor Function (SEA), which may include interaction with the AUSF 314 and the UE 302, receipt of an intermediate key that was established as a result of the UE 302 authentication process. Where USIM based authentication is used, the AMF 312 may retrieve the security material from the AUSF 314. AMF 312 may also include a Security Context Management (SCM) function, which receives a key from the SEA that it uses to derive access-network specific keys. Furthermore, AMF 312 may be a termination point of RAN CP interface (N2 reference point), a termination point of NAS (NI) signaling, and perform NAS ciphering and integrity protection.

AMF 312 may also support NAS signaling with a UE 302 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 302 and AMF 312, and relay uplink and downlink user-plane packets between the UE 302 and UPF 304. The N3IWF also provides mechanisms for IPsec tunnel establishment with the UE 302.

The SMF 318 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 318 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 316 may provide means for securely exposing the services and capabilities provided by 3GPP network functions for third party, internal exposure/re-exposure, Application Functions (e.g., AF 326), edge computing or fog computing systems, etc. In such embodiments, the NEF 316 may authenticate, authorize, and/or throttle the AFs. NEF 316 may also translate information exchanged with the AF 326 and information exchanged with internal network functions. For example, the NEF 316 may translate between an AF-Service-Identifier and an internal 5GC information. NEF 316 may also receive information from other network functions (NFs) based on exposed capabilities of other network functions. This information may be stored at the NEF 316 as structured data, or at a data storage NF using a standardized interfaces. The stored information can then be re-exposed by the NEF 316 to other NFs and AFs, and/or used for other purposes such as analytics.

The NRF 320 may support service discovery functions, receive NF Discovery Requests from NF instances, and provide the information of the discovered NF instances to the NF instances. NRF 320 also maintains information of available NF instances and their supported services.

The PCF 322 may provide policy rules to control plane function(s) to enforce them, and may also support unified policy framework to govern network behavior. The PCF 322 may also implement a front end (FE) to access subscription information relevant for policy decisions in a UDR of UDM 324.

The UDM 324 may handle subscription-related information to support the network entities' handling of communication sessions, and may store subscription data of UE 302. The UDM 324 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 322. UDM 324 may also support SMS management, wherein an SMS-FE implements the similar application logic as discussed previously.

The AF 326 may provide application influence on traffic routing, access to the Network Capability Exposure (NCE), and interact with the policy framework for policy control. The NCE may be a mechanism that allows the 5GC and AF 326 to provide information to each other via NEF 316, which may be used for edge computing implementations. In such implementations, the network operator and third party services may be hosted close to the UE 302 access point of attachment to achieve an efficient service delivery through the reduced end-to-end latency and load on the transport network. For edge computing implementations, the 5GC may select a UPF 304 close to the UE 302 and execute traffic steering from the UPF 304 to DN 306 via the N6 interface. This may be based on the UE subscription data, UE location, and information provided by the AF 326. In this way, the AF 326 may influence UPF (re)selection and traffic routing. Based on operator deployment, when AF 326 is considered to be a trusted entity, the network operator may permit AF 326 to interact directly with relevant NFs.

As discussed previously, the CN 310 may include an SMSF, which may be responsible for SMS subscription checking and verification, and relaying SM messages to/from the UE 302 to/from other entities, such as an SMS-GMSC/IWMSC/SMS-router. The SMS may also interact with AMF 312 and UDM 324 for notification procedure that the UE 302 is available for SMS transfer (e.g., set a UE not reachable flag, and notifying UDM 324 when UE 302 is available for SMS).

The system 300 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 300 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 310 may include an Nx interface, which is an inter-CN interface between the MME (e.g., MME(s) 608) and the AMF 312 in order to enable interworking between CN 310 and CN 606.

Although not shown by FIG. 3, the system 300 may include multiple RAN nodes (such as (R)AN node 308) wherein an Xn interface is defined between two or more (R)AN node 308 (e.g., gNBs and the like) that connecting to 5GC 410, between a (R)AN node 308 (e.g., gNB) connecting to CN 310 and an eNB, and/or between two eNBs connecting to CN 310.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 302 in a connected mode (e.g., CM-CONNECTED) including functionality to manage the UE mobility for connected mode between one or more (R)AN node 308. The mobility support may include context transfer from an old (source) serving (R)AN node 308 to new (target) serving (R)AN node 308; and control of user plane tunnels between old (source) serving (R)AN node 308 to new (target) serving (R)AN node 308.

A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 4:
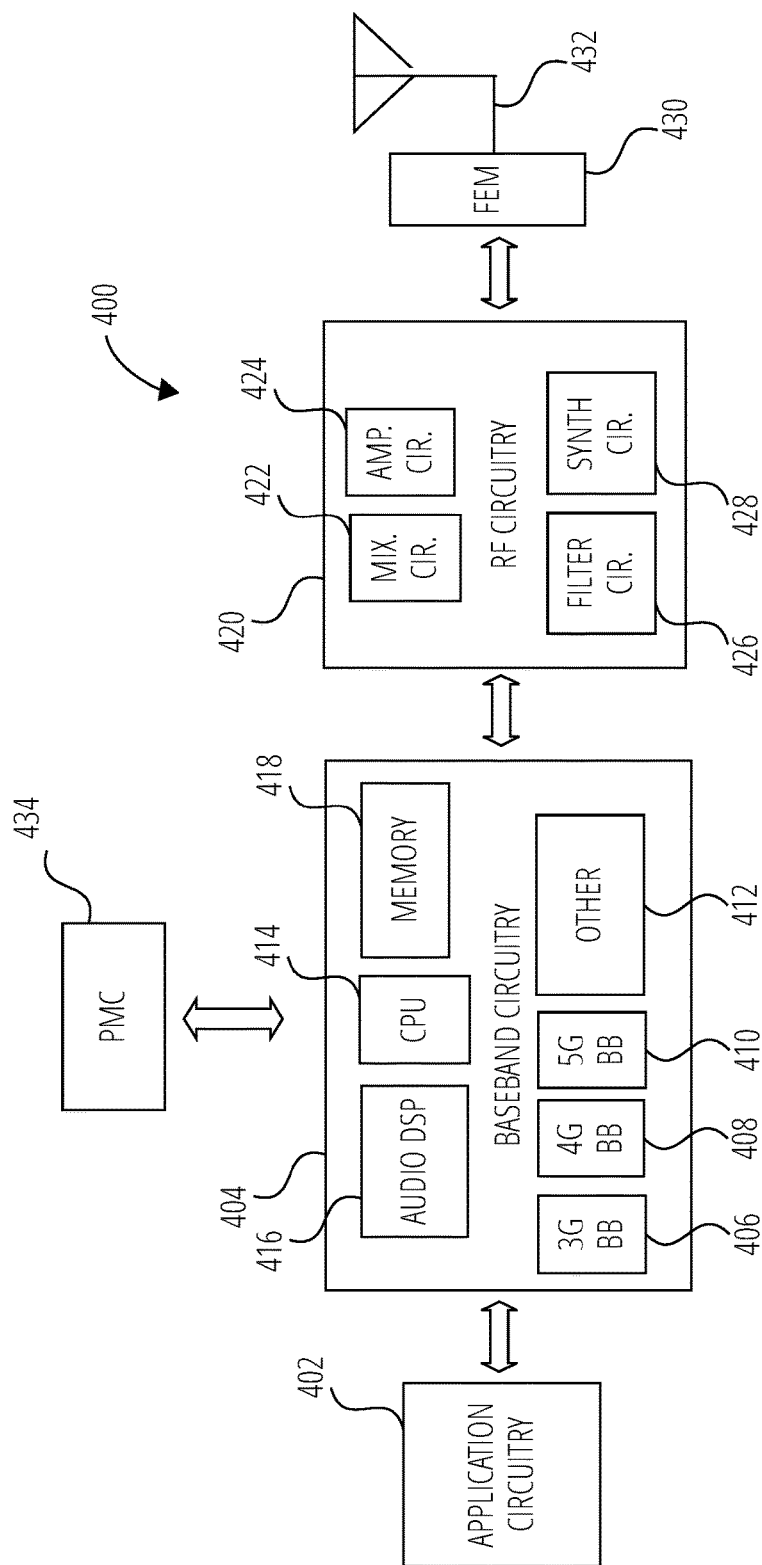
FIG. 4 illustrates a device in accordance with one embodiment.

FIG. 4 illustrates example components of a device 400 in accordance with some embodiments. In some embodiments, the device 400 may include application circuitry 402, baseband circuitry 404, Radio Frequency (RF) circuitry (shown as RF circuitry 420), front-end module (FEM) circuitry (shown as FEM circuitry 430), one or more antennas 432, and power management circuitry (PMC) (shown as PMC 434) coupled together at least as shown. The components of the illustrated device 400 may be included in a UE or a RAN node. In some embodiments, the device 400 may include fewer elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 420 and to generate baseband signals for a transmit signal path of the RF circuitry 420. The baseband circuitry 404 may interface with the application circuitry 402 for generation and processing of the baseband signals and for controlling operations of the RF circuitry 420. For example, in some embodiments, the baseband circuitry 404 may include a third generation (3G) baseband processor (3G baseband processor 406), a fourth generation (4G) baseband processor (4G baseband processor 408), a fifth generation (5G) baseband processor (5G baseband processor 410), or other baseband processor(s) 412 for other existing generations, generations in development or to be developed in the future (e.g., second generation (2G), sixth generation (6G), etc.). The baseband circuitry 404 (e.g., one or more of baseband processors) may handle various radio control functions that enable communication with one or more radio networks via the RF circuitry 420. In other embodiments, some or all of the functionality of the illustrated baseband processors may be included in modules stored in the memory 418 and executed via a Central Processing Unit (CPU 414). The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include a digital signal processor (DSP), such as one or more audio DSP(s) 416. The one or more audio DSP(s) 416 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

The RF circuitry 420 may enable communication with wireless networks using modulated electromagnetic radiation through a non-solid medium. In various embodiments, the RF circuitry 420 may include switches, filters, amplifiers, etc. to facilitate the communication with the wireless network. The RF circuitry 420 may include a receive signal path which may include circuitry to down-convert RF signals received from the FEM circuitry 430 and provide baseband signals to the baseband circuitry 404. The RF circuitry 420 may also include a transmit signal path which may include circuitry to up-convert baseband signals provided by the baseband circuitry 404 and provide RF output signals to the FEM circuitry 430 for transmission.

In some embodiments, the receive signal path of the RF circuitry 420 may include mixer circuitry 422, amplifier circuitry 424 and filter circuitry 426. In some embodiments, the transmit signal path of the RF circuitry 420 may include filter circuitry 426 and mixer circuitry 422. The RF circuitry 420 may also include synthesizer circuitry 428 for synthesizing a frequency for use by the mixer circuitry 422 of the receive signal path and the transmit signal path. In some embodiments, the mixer circuitry 422 of the receive signal path may be configured to down-convert RF signals received from the FEM circuitry 430 based on the synthesized frequency provided by synthesizer circuitry 428. The amplifier circuitry 424 may be configured to amplify the down-converted signals and the filter circuitry 426 may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, the mixer circuitry 422 of the receive signal path may comprise passive mixers, although the scope of the embodiments is not limited in this respect.

In some embodiments, the mixer circuitry 422 of the transmit signal path may be configured to up-convert input baseband signals based on the synthesized frequency provided by the synthesizer circuitry 428 to generate RF output signals for the FEM circuitry 430. The baseband signals may be provided by the baseband circuitry 404 and may be filtered by the filter circuitry 426.

In some embodiments, the mixer circuitry 422 of the receive signal path and the mixer circuitry 422 of the transmit signal path may include two or more mixers and may be arranged for quadrature downconversion and upconversion, respectively. In some embodiments, the mixer circuitry 422 of the receive signal path and the mixer circuitry 422 of the transmit signal path may include two or more mixers and may be arranged for image rejection (e.g., Hartley image rejection). In some embodiments, the mixer circuitry 422 of the receive signal path and the mixer circuitry 422 may be arranged for direct downconversion and direct upconversion, respectively. In some embodiments, the mixer circuitry 422 of the receive signal path and the mixer circuitry 422 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 420 may include analog-to-digital converter (ADC) and digital-to-analog converter (DAC) circuitry and the baseband circuitry 404 may include a digital baseband interface to communicate with the RF circuitry 420.

In some dual-mode embodiments, a separate radio IC circuitry may be provided for processing signals for each spectrum, although the scope of the embodiments is not limited in this respect.

In some embodiments, the synthesizer circuitry 428 may be a fractional-N synthesizer or a fractional N/N+1 synthesizer, although the scope of the embodiments is not limited in this respect as other types of frequency synthesizers may be suitable. For example, synthesizer circuitry 428 may be a delta-sigma synthesizer, a frequency multiplier, or a synthesizer comprising a phase-locked loop with a frequency divider.

The synthesizer circuitry 428 may be configured to synthesize an output frequency for use by the mixer circuitry 422 of the RF circuitry 420 based on a frequency input and a divider control input. In some embodiments, the synthesizer circuitry 428 may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

Synthesizer circuitry 428 of the RF circuitry 420 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 428 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 420 may include an IQ/polar converter.

The FEM circuitry 430 may include a receive signal path which may include circuitry configured to operate on RF signals received from one or more antennas 432, amplify the received signals and provide the amplified versions of the received signals to the RF circuitry 420 for further processing. The FEM circuitry 430 may also include a transmit signal path which may include circuitry configured to amplify signals for transmission provided by the RF circuitry 420 for transmission by one or more of the one or more antennas 432. In various embodiments, the amplification through the transmit or receive signal paths may be done solely in the RF circuitry 420, solely in the FEM circuitry 430, or in both the RF circuitry 420 and the FEM circuitry 430.

In some embodiments, the FEM circuitry 430 may include a TX/RX switch to switch between transmit mode and receive mode operation. The FEM circuitry 430 may include a receive signal path and a transmit signal path. The receive signal path of the FEM circuitry 430 may include an LNA to amplify received RF signals and provide the amplified received RF signals as an output (e.g., to the RF circuitry 420). The transmit signal path of the FEM circuitry 430 may include a power amplifier (PA) to amplify input RF signals (e.g., provided by the RF circuitry 420), and one or more filters to generate RF signals for subsequent transmission (e.g., by one or more of the one or more antennas 432).

In some embodiments, the PMC 434 may manage power provided to the baseband circuitry 404. In particular, the PMC 434 may control power-source selection, voltage scaling, battery charging, or DC-to-DC conversion. The PMC 434 may often be included when the device 400 is capable of being powered by a battery, for example, when the device 400 is included in a UE. The PMC 434 may increase the power conversion efficiency while providing desirable implementation size and heat dissipation characteristics.

FIG. 4 shows the PMC 434 coupled only with the baseband circuitry 404. However, in other embodiments, the PMC 434 may be additionally or alternatively coupled with, and perform similar power management operations for, other components such as, but not limited to, the application circuitry 402, the RF circuitry 420, or the FEM circuitry 430.

In some embodiments, the PMC 434 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
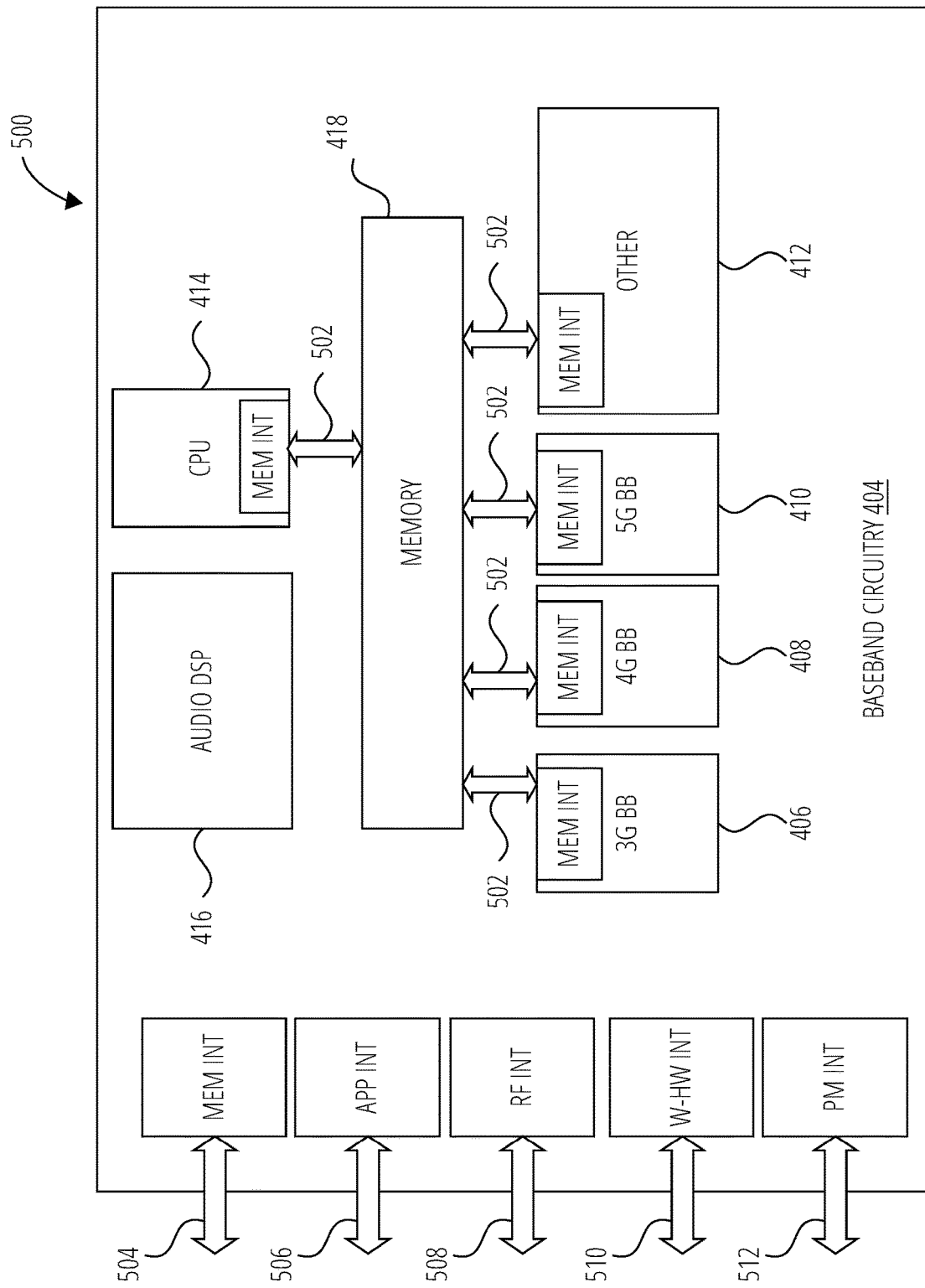
FIG. 5 illustrates an example interfaces in accordance with one embodiment.

FIG. 5 illustrates example interfaces 500 of baseband circuitry in accordance with some embodiments. As discussed above, the baseband circuitry 404 of FIG. 4 may comprise 3G baseband processor 406, 4G baseband processor 408, 5G baseband processor 410, other baseband processor(s) 412, CPU 414, and a memory 418 utilized by said processors. As illustrated, each of the processors may include a respective memory interface 502 to send/receive data to/from the memory 418.

The baseband circuitry 404 may further include one or more interfaces to communicatively couple to other circuitries/devices, such as a memory interface 504 (e.g., an interface to send/receive data to/from memory external to the baseband circuitry 404), an application circuitry interface 506 (e.g., an interface to send/receive data to/from the application circuitry 402 of FIG. 4), an RF circuitry interface 508 (e.g., an interface to send/receive data to/from RF circuitry 420 of FIG. 4), a wireless hardware connectivity interface 510 (e.g., an interface to send/receive data to/from Near Field Communication (NFC) components, Bluetooth® components (e.g., Bluetooth® Low Energy), Wi-Fi® components, and other communication components), and a power management interface 512 (e.g., an interface to send/receive power or control signals to/from the PMC 434.

Figure 6:
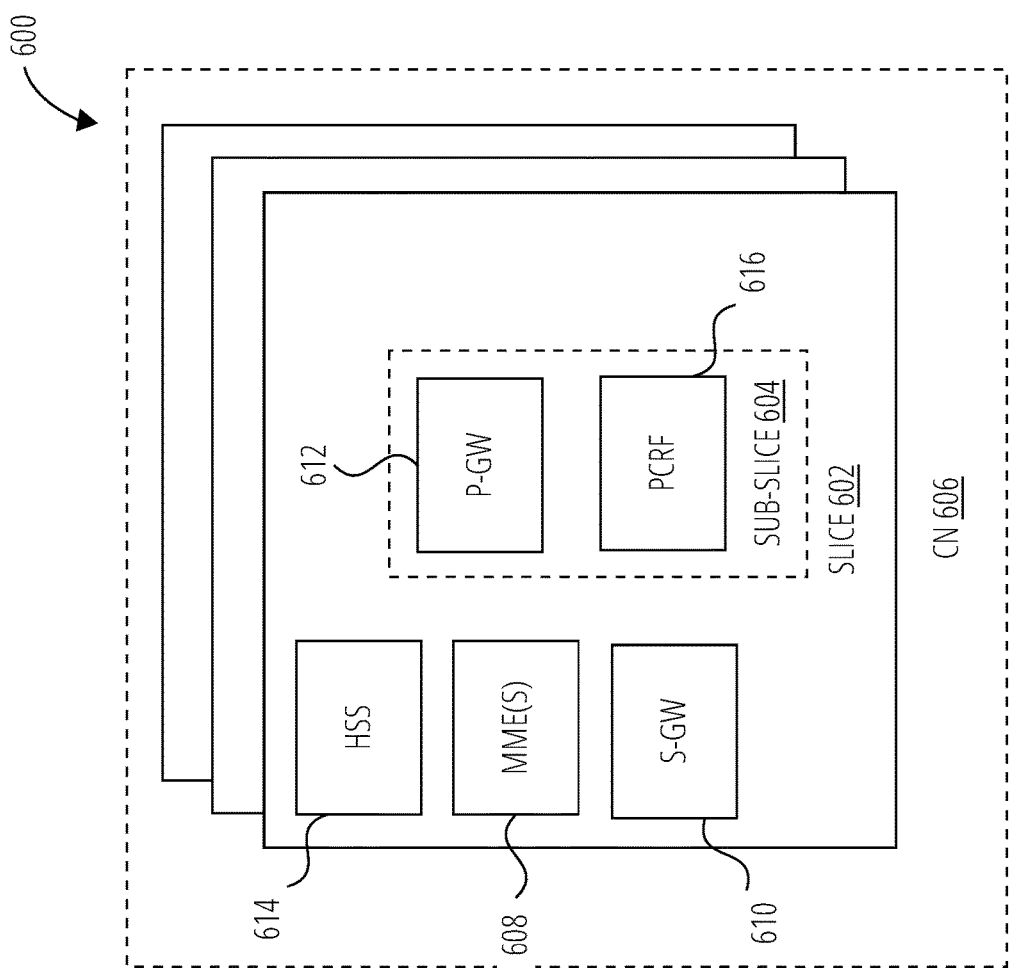
FIG. 6 illustrates components in accordance with one embodiment.

FIG. 6 illustrates components 600 of a core network in accordance with some embodiments. The components of the CN 606 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 606 may be referred to as a network slice 602 (e.g., the network slice 602 is shown to include the HSS 614, the MME(s) 608, and the S-GW 610). A logical instantiation of a portion of the CN 606 may be referred to as a network sub-slice 604 (e.g., the network sub-slice 604 is shown to include the P-GW 612 and the PCRF 616).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
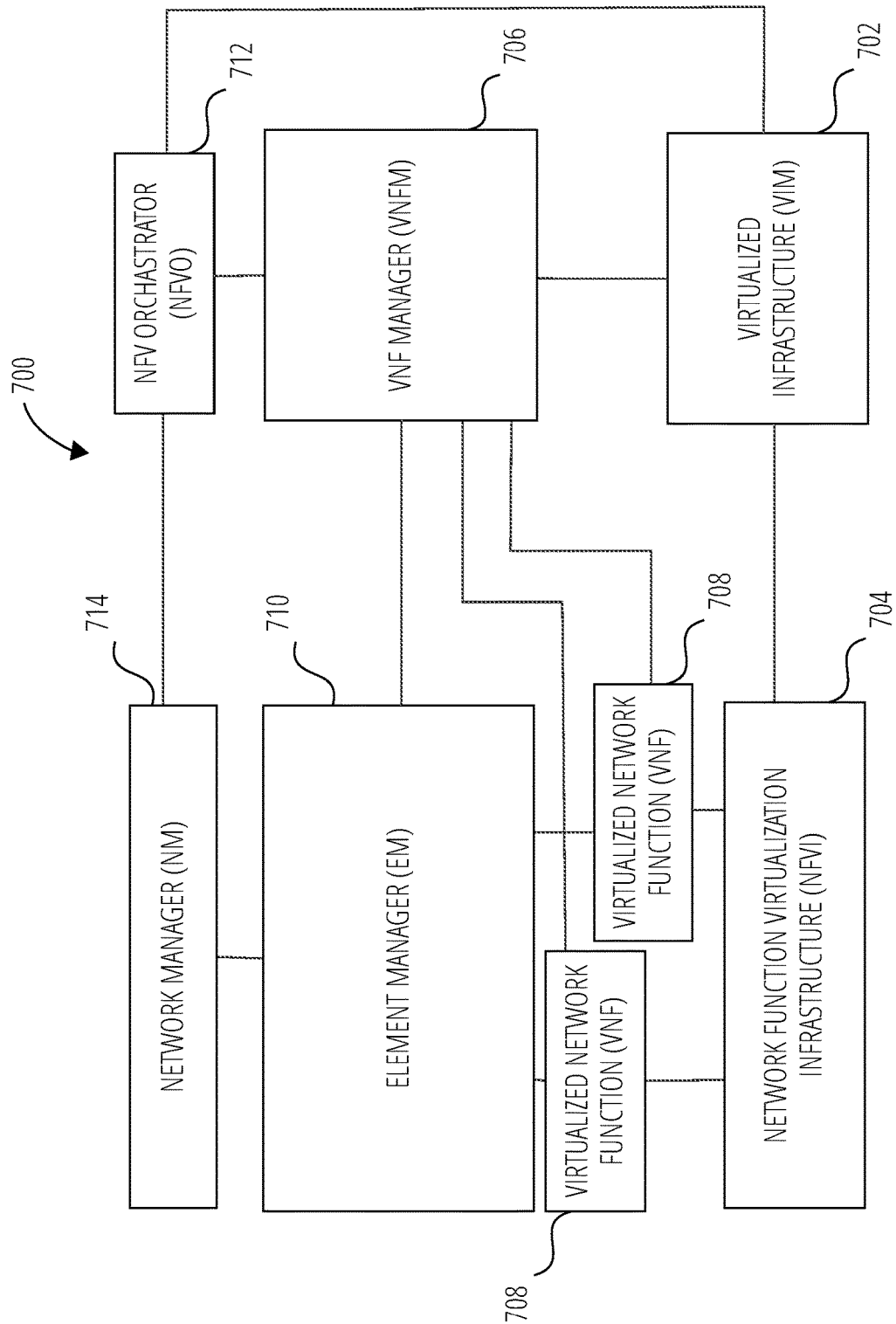
FIG. 7 illustrates a system in accordance with one embodiment.

FIG. 7 is a block diagram illustrating components, according to some example embodiments, of a system 700 to support NFV. The system 700 is illustrated as including a virtualized infrastructure manager (shown as VIM 702), a network function virtualization infrastructure (shown as NFVI 704), a VNF manager (shown as VNFM 706), virtualized network functions (shown as VNF 708), an element manager (shown as EM 710), an NFV Orchestrator (shown as NFVO 712), and a network manager (shown as NM 714).

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNF 708. The VNF 708 may be used to execute EPC components/functions. The VNFM 706 may manage the life cycle of the VNF 708 and track performance, fault and security of the virtual aspects of VNF 708. The EM 710 may track the performance, fault and security of the functional aspects of VNF 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
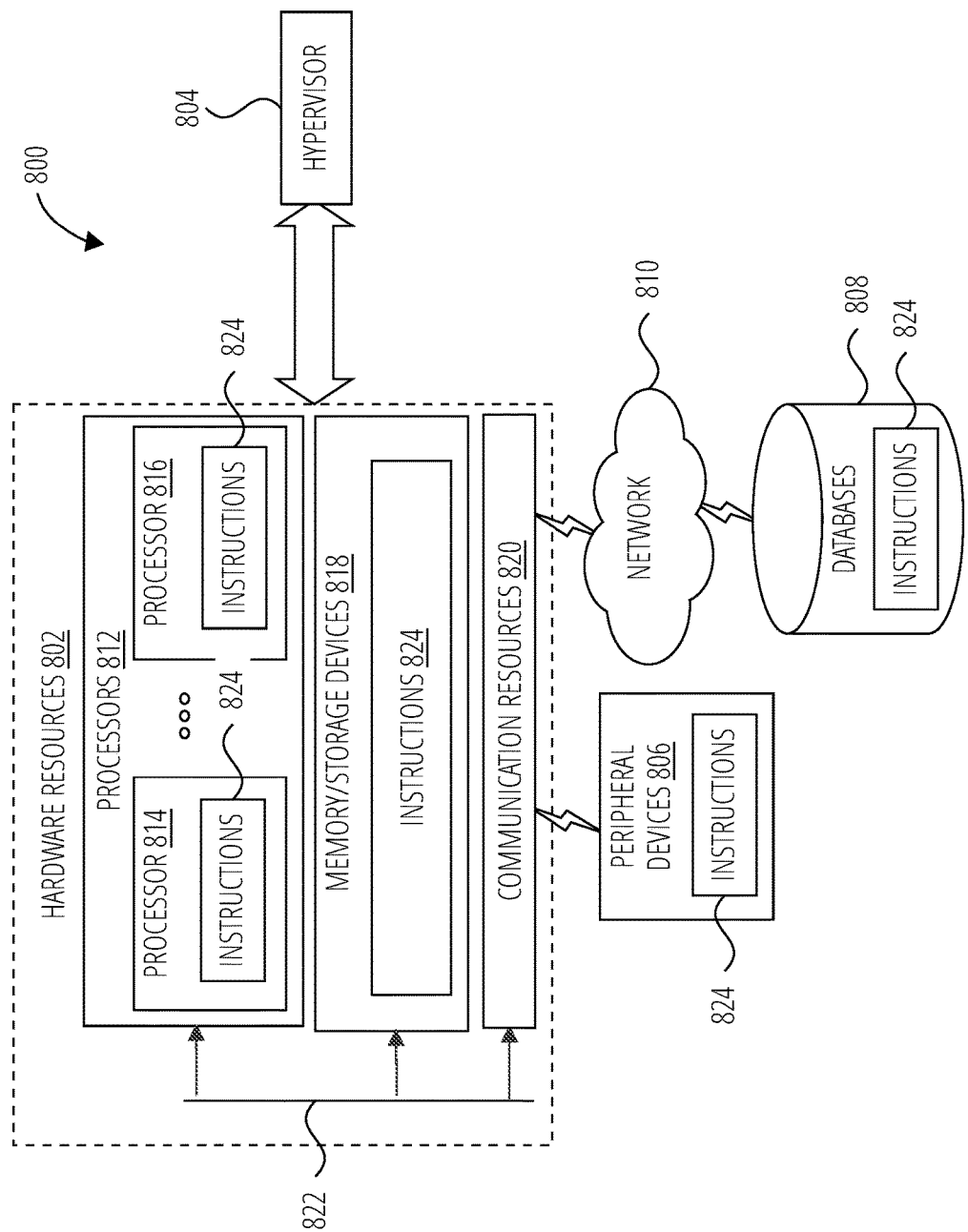
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section.

The following examples pertain to further embodiments.

Example 1 is an apparatus a user equipment (UE). The apparatus includes a memory interface, measurement circuitry, and a baseband processor. The memory interface to send or receive, to or from a memory device, data for a report to send to a g Node B (gNB) in a wireless network. The measurement circuitry to measure a layer one reference signal received power (L1-RSRP) for a plurality of resources corresponding to different transmit (Tx) beams configured for measurement by the UE. The baseband processor to: determine a selected Tx beam of the different Tx beams based on measured L1-RSRP for the plurality of resources, wherein an L1-RSRP value corresponding to the selected Tx beam is measured with a predetermined L1-RSRP accuracy to provide that the selected Tx beam is within a number of largest L1-RSRP values of the measured L1-RSRP of the different Tx beams; and generate the report including an indication of the selected Tx beam and the L1-RSRP value measured with the predetermined L1-RSRP accuracy.

Example 2 is the apparatus of Example 1, wherein the predetermined L1 RSRP accuracy is ±2.5 dB.

Example 3 is the apparatus of Example 2, wherein the different Tx beams comprise 8 Tx beams, and wherein the number of largest L1-RSRP values correspond to 5 best beams of the 8 Tx beams.

Example 4 is the apparatus of Example 2, wherein the different Tx beams comprise 16 Tx beams, and wherein the number of largest L1-RSRP values correspond to 8 best beams of the 16 Tx beams.

Example 5 is the apparatus of Example 2, wherein the different Tx beams comprise 32 Tx beams, and wherein the number of largest L1-RSRP values correspond to 12 best beams of the 32 Tx beams.

Example 6 is the apparatus of Example 1, wherein to measure the L1-RSRP for the plurality of resources comprises to measure a plurality of samples of the L1-RSRP for each of the plurality of resources, the baseband processor further to average the plurality of samples corresponding to each of the plurality of resources.

Example 7 is the apparatus of Example 1, wherein to measure the L1-RSRP for the plurality of resources comprises to measure a single sample of L1-RSRP for each of the plurality of resources.

Example 8 is the apparatus of Example 7, wherein the plurality of resources is configured as synchronization signal block (SSB) resources corresponding to the different Tx beams, and wherein the predetermined L1 RSRP accuracy for the SSB is ±5.5 dB when a corresponding signal-to-noise ratio (SNR) is at least −3 dB.

Example 9 is the apparatus of Example 7, wherein the plurality of resources is configured as channel state information reference signal (CSI-RS) resources corresponding to the different Tx beams, and wherein the predetermined L1 RSRP accuracy for the CSI-RS transmitted with a density of 3 is ±5.5 dB when a corresponding signal-to-noise ratio (SNR) is at least −3 dB.

Example 10 is the apparatus of Example 7, wherein the plurality of resources is configured as synchronization signal block (SSB) resources corresponding to the different Tx beams, and wherein the predetermined L1 RSRP accuracy for the SSB is ±2 dB when a corresponding signal-to-noise ratio (SNR) is greater than or equal to −2 dB.

Example 11 is the apparatus of Example 7, wherein the plurality of resources is configured as channel state information reference signal (CSI-RS) resources corresponding to the different Tx beams, and wherein the predetermined L1 RSRP accuracy for the CSI-RS transmitted with a density of 3 is ±4.5 dB when the corresponding SNR is greater than or equal to −2 dB.

Example 12 is the apparatus of Example 7, wherein the plurality of resources is configured as channel state information reference signal (CSI-RS) resources corresponding to the different Tx beams, and wherein the predetermined L1 RSRP accuracy for the CSI-RS transmitted with a density of 3 and a bandwidth of 48 physical resource blocks (PRBs) is ±4.5 dB when the corresponding SNR is at least −3 dB.

Example 13 is a method for beam management by a user equipment (UE) in a wireless communication system. The method includes: identifying a plurality of resources corresponding to different transmit (Tx) beams configured for measurement by the UE; measuring a layer one reference signal received power (L1-RSRP) for the plurality of resources; determining a selected Tx beam of the different Tx beams based on measured L1-RSRP for the plurality of resources, wherein an L1-RSRP value corresponding to the selected Tx beam is measured with a predetermined L1-RSRP accuracy to provide that the selected Tx beam is within a number of largest L1-RSRP values of the measured L1-RSRP of the different Tx beams; and generating a report including an indication of the selected Tx beam and the L1-RSRP value measured with the predetermined L1-RSRP accuracy.

Example 14 is the method of Example 13, wherein the predetermined L1 RSRP accuracy is ±2.5 dB.

Example 15 is the method of Example 14, wherein the different Tx beams comprise 8 Tx beams, and wherein the number of largest L1-RSRP values correspond to 5 best beams of the 8 Tx beams.

Example 16 is the method of Example 14, wherein the different Tx beams comprise 16 Tx beams, and wherein the number of largest L1-RSRP values correspond to 8 best beams of the 16 Tx beams.

Example 17 is the method of Example 14, wherein the different Tx beams comprise 32 Tx beams, and wherein the number of largest L1-RSRP values correspond to 12 best beams of the 32 Tx beams.

Example 18 is the method of Example 13, wherein to measure the L1-RSRP for the plurality of resources comprises measuring a plurality of samples of the L1-RSRP for each of the plurality of resources, the method further comprising averaging the plurality of samples corresponding to each of the plurality of resources.

Example 19 is the method of Example 13, wherein to measure the L1-RSRP for the plurality of resources comprises measuring a single sample of L1-RSRP for each of the plurality of resources.

Example 20 is the method of Example 19, wherein the plurality of resources is configured as synchronization signal block (SSB) resources corresponding to the different Tx beams, and wherein the predetermined L1 RSRP accuracy for the SSB is ±5.5 dB when a corresponding signal-to-noise ratio (SNR) is at least −3 dB.

Example 21 is the method of Example 19, wherein the plurality of resources is configured as channel state information reference signal (CSI-RS) resources corresponding to the different Tx beams, and wherein the predetermined L1 RSRP accuracy for the CSI-RS transmitted with a density of 3 is ±5.5 dB when a corresponding signal-to-noise ratio (SNR) is at least −3 dB.

Example 22 is the method of Example 19, wherein the plurality of resources is configured as synchronization signal block (SSB) resources corresponding to the different Tx beams, and wherein the predetermined L1 RSRP accuracy for the SSB is ±2 dB when a corresponding signal-to-noise ratio (SNR) is greater than or equal to −2 dB.

Example 23 is the method of Example 19, wherein the plurality of resources is configured as channel state information reference signal (CSI-RS) resources corresponding to the different Tx beams, and wherein the predetermined L1 RSRP accuracy for the CSI-RS transmitted with a density of 3 is ±4.5 dB when the corresponding SNR is greater than or equal to −2 dB.

Example 24 is the method of Example 19, wherein the plurality of resources is configured as channel state information reference signal (CSI-RS) resources corresponding to the different Tx beams, and wherein the predetermined L1 RSRP accuracy for the CSI-RS transmitted with a density of 3 and a bandwidth of 48 physical resource blocks (PRBs) is ±4.5 dB when the corresponding SNR is at least −3 dB.

Example 25 is a non-transitory computer-readable storage medium including instructions that, when processed by a processor, configure the processor to perform the method of any one of Example 13 to Example 24.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus a user equipment (UE), the apparatus comprising:
   a memory interface to send or receive, to or from a memory device, data for a report to send to a g Node B (gNB) in a wireless network;
   measurement circuitry to measure a layer one reference signal received power (L1-RSRP) for a plurality of resources corresponding to different transmit (Tx) beams configured for measurement by the UE; and
   a baseband processor to:
   determine a selected Tx beam of the different Tx beams based on measured L1-RSRP for the plurality of resources, wherein an L1-RSRP value corresponding to the selected Tx beam is measured with a predetermined L1-RSRP accuracy to provide that the selected Tx beam is within a number of largest L1-RSRP values of the measured L1-RSRP of the different Tx beams; and
   generate the report including an indication of the selected Tx beam and the L1-RSRP value measured with the predetermined L1-RSRP accuracy,
   wherein the plurality of resources is configured as channel state information reference signal (CSI-RS) resources corresponding to the different Tx beams, and wherein the predetermined L1-RSRP accuracy for the CSI-RS transmitted with a density of 3 and a bandwidth of 48 physical resource blocks (PRBs) is ±4.5 dB when the corresponding SNR is at least −3 dB.

2. The apparatus of claim 1, wherein to measure the L1-RSRP for the plurality of resources comprises to measure a plurality of samples of the L1-RSRP for each of the plurality of resources, the baseband processor further to average the plurality of samples corresponding to each of the plurality of resources.

3. The apparatus of claim 1, wherein to measure the L1-RSRP for the plurality of resources comprises to measure a single sample of L1-RSRP for each of the plurality of resources.

4. A method for beam management by a user equipment (UE) in a wireless communication system, the method comprising:
   identifying a plurality of resources corresponding to different transmit (Tx) beams configured for measurement by the UE;
   measuring a layer one reference signal received power (L1-RSRP) for the plurality of resources;
   determining a selected Tx beam of the different Tx beams based on measured L1-RSRP for the plurality of resources, wherein an L1-RSRP value corresponding to the selected Tx beam is measured with a predetermined L1-RSRP accuracy to provide that the selected Tx beam is within a number of largest L1-RSRP values of the measured L1-RSRP of the different Tx beams; and
   generating a report including an indication of the selected Tx beam and the L1-RSRP value measured with the predetermined L1-RSRP accuracy,
   wherein the plurality of resources is configured as channel state information reference signal (CSI-RS) resources corresponding to the different Tx beams, and wherein the predetermined L1-RSRP accuracy for the CSI-RS transmitted with a density of 3 and a bandwidth of 48 physical resource blocks (PRBs) is ±4.5 dB when the corresponding SNR is at least −3 dB.

5. The method of claim 4, wherein to measure the L1-RSRP for the plurality of resources comprises measuring a plurality of samples of the L1-RSRP for each of the plurality of resources, the method further comprising averaging the plurality of samples corresponding to each of the plurality of resources.

6. The method of claim 4, wherein to measure the L1-RSRP for the plurality of resources comprises measuring a single sample of L1-RSRP for each of the plurality of resources.

* * * * *